(12) United States Patent
Avrahami

(10) Patent No.: US 9,183,709 B2
(45) Date of Patent: Nov. 10, 2015

(54) WEARABLE DEVICE AS AN AMBIENT INFORMATION DISPLAY

(71) Applicant: Intel Corporation, Santa Clara, CA (US)

(72) Inventor: Daniel Avrahami, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/226,043

(22) Filed: Mar. 26, 2014

(65) Prior Publication Data

US 2015/0279168 A1    Oct. 1, 2015

(51) Int. Cl.
*G08B 1/08* (2006.01)
*G08B 5/36* (2006.01)
*G08B 25/01* (2006.01)

(52) U.S. Cl.
CPC ............... *G08B 5/36* (2013.01); *G08B 25/016* (2013.01)

(58) Field of Classification Search
CPC ........................................................ G08B 5/36
USPC ................................ 340/539.11, 573.1, 539.1
See application file for complete search history.

(56) References Cited

U.S. PATENT DOCUMENTS

| | | | |
|---|---|---|---|
| 6,703,930 B2 * | 3/2004 | Skinner | 340/539.11 |
| 6,762,685 B2 * | 7/2004 | Muto et al. | 340/539.1 |
| 7,378,954 B2 * | 5/2008 | Wendt | 340/539.11 |
| 8,725,842 B1 * | 5/2014 | Al-Nasser | 709/219 |
| 8,854,925 B1 * | 10/2014 | Lee et al. | 368/10 |
| 2006/0198120 A1 * | 9/2006 | Guzman | 362/103 |
| 2013/0119255 A1 * | 5/2013 | Dickinson et al. | 250/340 |

* cited by examiner

*Primary Examiner* — Eric M Blount
(74) *Attorney, Agent, or Firm* — Schwegman Lundberg & Woessner, P.A.

(57) ABSTRACT

A wearable device may include an inward-facing surface, an outward-facing surface, and a plurality of light emitting elements disposed on the inward-facing surface. A worn-status module of the wearable device may detect a worn-status of the wearable device and set the notification mode to a light notification mode when the worn-status indicates the wearable device is not being worn. A message module of the wearable module may receive a message. A notification module of the wearable device may, based on the receipt of the message and the worn-status of the wearable device, control the plurality of light emitting elements.

25 Claims, 7 Drawing Sheets

WEARABLE DEVICE AS AN AMBIENT INFORMATION DISPLAY

TECHNICAL FIELD

Embodiments described herein generally relate to wearable devices and in particular, but not limited to, a wearable device as an ambient information display.

BACKGROUND

Consumers are increasingly using wearable devices for a variety of purposes. For example, wrist-worn devices are being used to track health statistics such as how many steps a person has taken throughout the day. Additionally, head-based wearable devices may provide navigation directions to a person as they walk.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

There are many instances in which a wearable device is not worn. For example, consider a distance tracking device. When the wearer is at home, he or she may take the device off and set it down on a counter or other surface. Similarly, at night the person may put the device on his or her nightstand while it is charging. During these times displaying information on the wearable device's primary display has a few downsides. First, if the display of the device is facing away from the user, the user may not see the information. Second, if the display is facing the user, the light from the display may be too bothersome in a nighttime situation.

In addition to wearable devices, ambient light devices exist that may present information to a user through the use of lighting. For example, a light-emitting diode (LED) on a mobile phone may change color when a user has an e-mail message or receives a notification message. In some examples, cars may change the interior color to signify driving efficiency.

In various examples described herein, a system is described that configures a wearable device to present information using ambient lighting when a user is not wearing the device. In various examples, the shape of the wearable device helps to constrain the lighting to the interior of the device to convey information in a unobtrusive manner. While many of the examples described herein refer to a bracelet-style wearable device, the examples may also be applied to other wearable devices such as head-mounted devices or audio headsets (e.g., Bluetooth® headsets).

Figure 1:
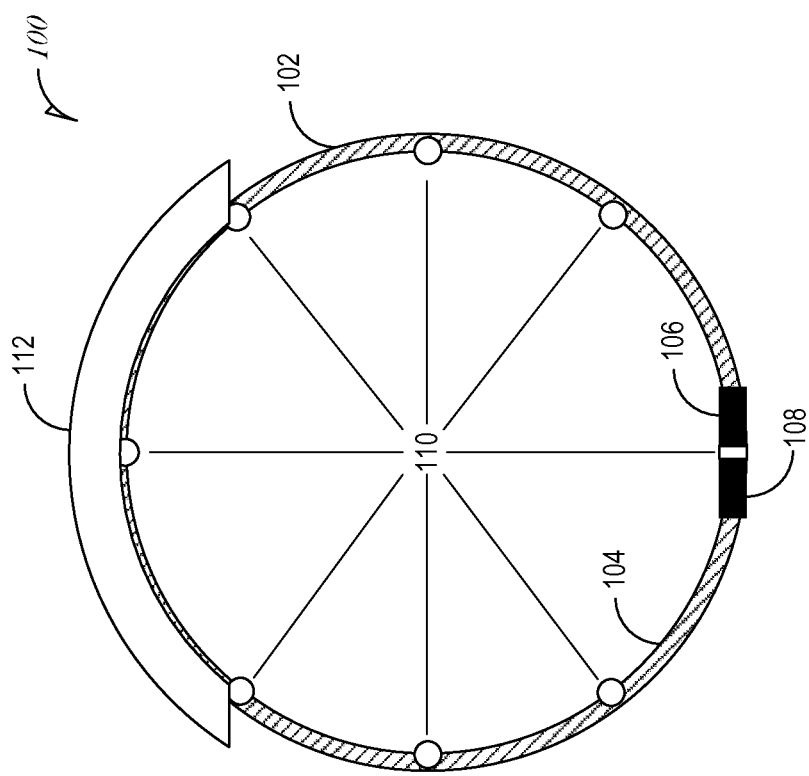
FIG. 1 is a schematic drawing illustrating a wrist-based wearable device, according to an embodiment.

FIG. 1 is a schematic drawing illustrating a wrist-based wearable device 100, according to an embodiment. In various examples, the wearable device 100 includes an outward-facing surface 102, an inward-facing surface 104, clasp portions 106, 108, light emitting elements 110, and a display 112.

In various examples, the wearable device 100 may be a smart watch, fitness tracking device, or secondary display device (e.g., receiving messages from a primary device such as a mobile phone). While being worn, a user may interface with the wearable device 100 using the display 112 (e.g., a touch-screen), hardware based buttons (not shown), gestures, or voice commands.

In various examples, the light emitting elements 110 are placed on or in the inward-facing surface 104 such that when the light emitting elements 110 are on, the light from the light emitting elements 110 shines across the empty ring towards the opposite side of the inward-facing surface 104. The light emitting elements 110 may be any type of light (e.g., light emitting diodes (LEDs)). In various examples, the light emitting elements 110 are capable of producing a variety of colors and brightness.

In various examples, clasp portions 106, 108 may be separated to allow the user to take the wearable device 100 off or put it on. In various examples, the wearable device 100 does not have a clasp, but instead the user slips the wearable device 100 on and off. In various examples, instead of, or in addition to, clasp portions 106, 108 the wearable device 100 may have an extendable strap.

Figure 2:
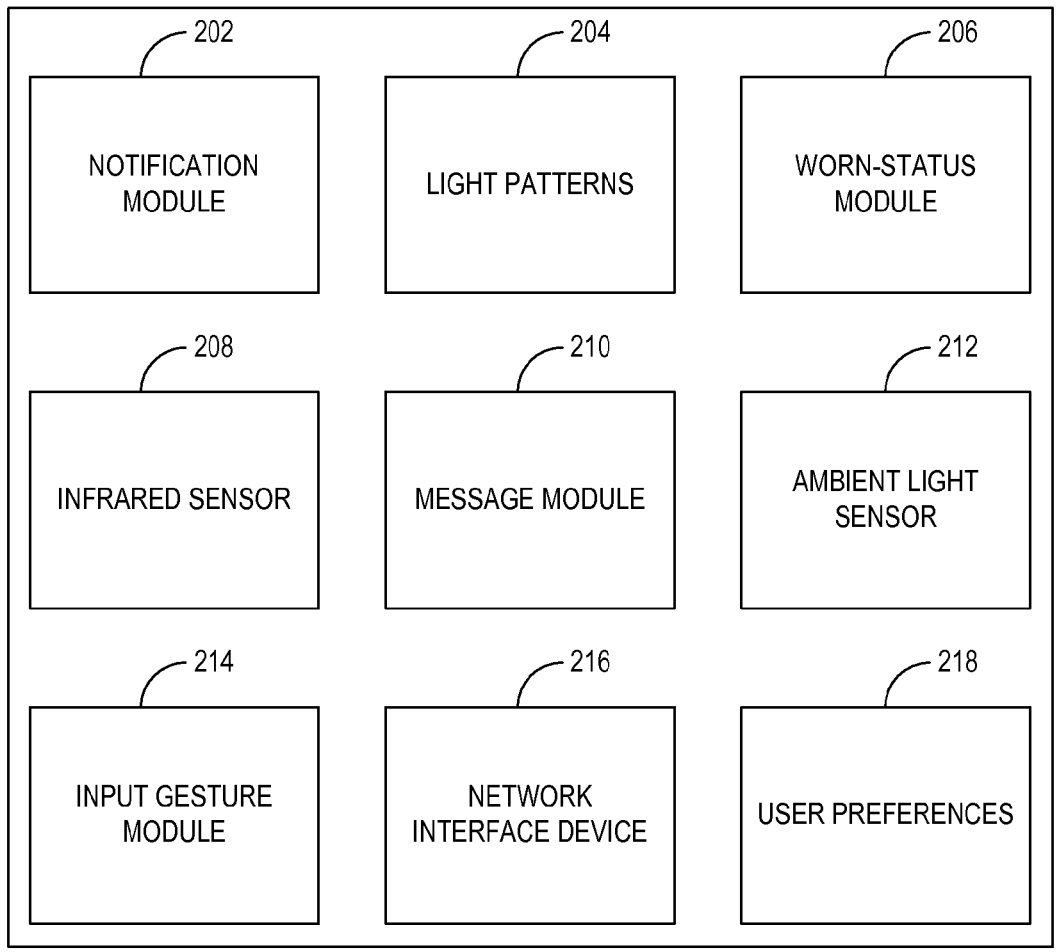
FIG. 2 is a system diagram illustrating components of a wearable device, according to an embodiment.

FIG. 2 is a system diagram 200 illustrating components of a wearable device (e.g., the wearable device 100), according to an embodiment. Diagram 200 includes a notification module 202, light patterns 204, a worn-status module 206, infrared sensor 208, a message module 210, an ambient light sensor 212, an input gesture module 214, a network interface device 216, and user preferences 218.

In various examples, the notification module 202 controls the light emitting elements 110. Control may include setting a color (hue, saturation, brightness), turning on and off a light, or patterns of light and "motion." A motion setting may relate to a light pattern that is created by turning on/off the light emitting elements 110 and, in some examples, in a pattern to simulate motion.

In various examples, the various patterns and motions that may be enabled are stored (e.g., in a non-transitory data storage device) in the light patterns 204. A light pattern may include settings related to a pattern sequence of illuminating one or more of the light emitting elements 110, a direction of the pattern, a speed of the pattern and a duration (e.g., in absolute time or in repeating the pattern). In various examples, the motion may be dictated in part by the type of message received at the wearable device 100, as discussed in more detail below. Additionally, the speed between each step of a light pattern sequence may be dynamic. For example, the time between turning on a first light emitting element and a second light emitting element is different than the time between turning on the second light emitting element and a third light emitting element.

Figure 3:
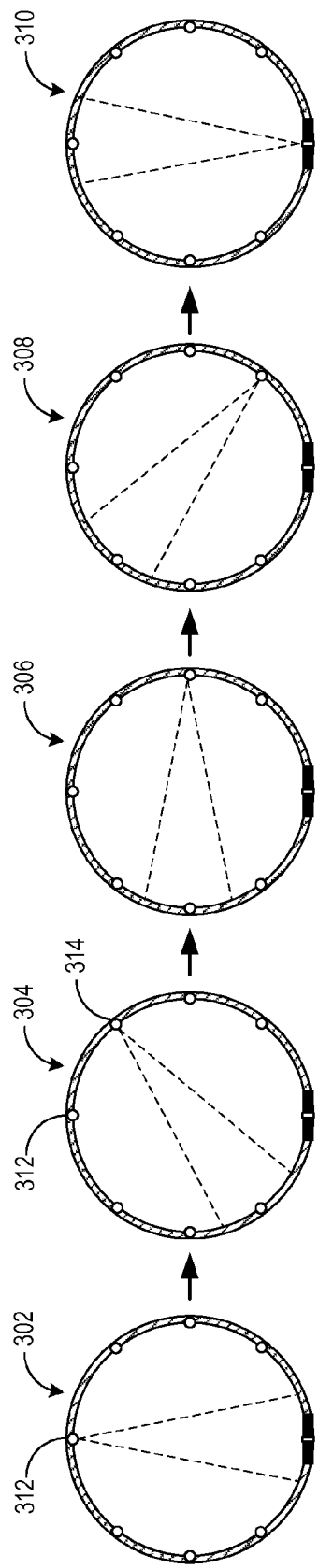
FIGS. 3-5 are light pattern progression diagrams, according to various embodiments.
Figure 4:
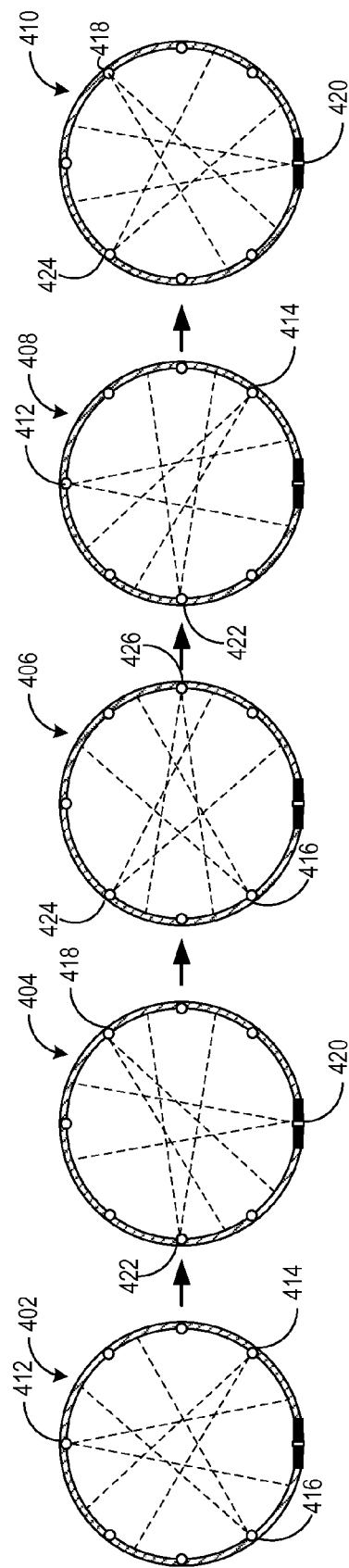
Figure 5:
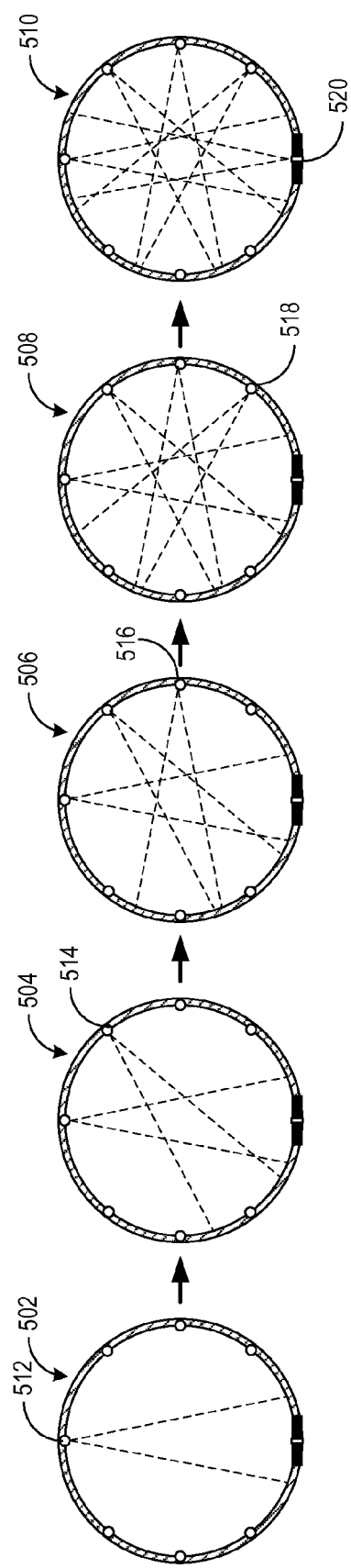

FIGS. 3-5 are light pattern progression diagrams, according to various embodiments. In an example, FIG. 3 illustrates a "spinning point" light pattern in which only a single light is on at a time. For example, at time 302, light emitting element 312 is on. Then, proceeding in a clock-wise pattern, at time 304, light emitting element 312 is turned off and light emitting element 314 is turned on. The progression continues with turning off a light and turning on the next light at times 306, 308, and 310. While not illustrated, the progression may continue until light 312 is turned on again and then the entire sequence may be repeated. The progression may also be implemented in a counter-clock-wise motion.

In an example, FIG. 4 illustrates a "carousel" light pattern in which multiple lights on are on and appear to rotate inside the wearable device 100. For example, at time 402, three light emitting elements 412, 414, and 416 are illustrated as being on. Then, at time 404, light emitting elements 412, 414, 416 are off and light emitting elements 418, 420, and 422 are on. The sequence continues at time 406 in which light emitting elements 418, 420, and 422 are off and light emitting elements 416, 424, and 426 are on. As illustrated, the sequence continues in a clock-wise pattern at times 408 and 410 such that, at each change in the sequence, a light emitting element next to a lit element is turned on and the lit element is turned off. While not illustrated, the progression may continue until light emitting elements 412, 414, and 416 are turned on again and then the entire sequence may be repeated. The progression may also be implemented in a counter-clock-wise motion.

In an example, FIG. 5 illustrates a "progress indication" light pattern. In various examples, this light pattern may be used when a message is received related to a download or other notification that includes a quantitative range (e.g., 0-100%) or a qualitative description that has been mapped to a range (e.g., almost done=80%). Depending on the information contained in the message, the lighting elements may be configured in differing manners. The "progress indication" light pattern may also be used without additional details (e.g., the sequence may be used as a pattern like those illustrated in FIGS. 3 and 4).

As illustrated, FIG. 5 illustrates an increasing number of light emitting elements being turned on. For example, at time 502 only one light, light emitting element 512, is turned on. Then at time 504, light emitting 514 is turned on while light emitting element 512 stays on. The sequence continues at time 506 in which light emitting element 516 is turned on, time 508 in which light emitting element 518 is turned on, and time 510 in which light emitting element 520 is turned on. While not illustrated, the sequence may continue until all of the light emitting elements are turned on.

In instances in which the light pattern is tied to progress data included in a message, the pattern may be static until receiving a further message. For example, if the message includes an indication that a download is 50% complete, the notification module 202 may set the light emitting elements to time 510. Whereas if the message indicates progress is at 25%, the notification module 202 may set the light emitting elements to time 506.

In various examples, other light patterns may be stored in light patterns 204. For example, a pulsing pattern may be used in which one or more of the light emitting elements 110 fade in and out. Another light pattern may be a fade-in or a fade-out of one or more of the light emitting elements 110. Another pattern may flash one or more of the light emitting elements 110. In an example, a light pattern may be a random turning on/off the light emitting elements 110. A "bounce" pattern may be use in which a first light emitting element is turned on and then that light is turned off followed by a light turning on across (or near to across) from the first light.

In various examples, the worn-status module 206 determines if the wearable device 100 is currently being worn by a user. Various methods may be used by the worn-status module 206 to make this determination. In an example, user input may be utilized by the worn-status module 206 to determine the worn state. For example, using hardware buttons or the display 112 a user may indicate that the wearable device 100 is currently being worn or not worn.

In various examples, the worn-status module 206 may use the state of the clasp portions 106, 108 to determine if the wearable device 100 is in an open or closed stated. The worn-status module 206 may determine that if the clasp portions 106, 108 are not together the wearable device 100 is not in a worn state. In instances where the wearable device 100 includes an extendable strap, the worn-status module 206 may determine that the wearable device 100 is in a worn-state when the extension of the strap is less than a threshold amount.

In various examples, the worn-status module 206 may utilize input from infrared sensor 208 to determine the worn state. For example, one or more infrared sensors may be placed on an inside surface 104 of the wearable device 100. The sensors may emit infrared light and measure the intensity of the response of the light hitting the opposite side of the wearable device 100 and reflecting back to the infrared sensor 208. In instances in which a user's wrist is in the wearable device 100 the intensity of the reflected light may be greater than when the user's wrist is not inside. Thus, the worn state may be based on the intensity of reflected light.

In various examples, the charging state of the wearable device 100 may be used to determine the worn state. For example, if the wearable device 100 is currently being charged, the worn-status module 206 may determine the wearable device 100 is not currently being worn. However, in various examples, the fact that the wearable device 100 is not being charged does not necessarily mean that the wearable device 100 is being worn.

In various examples, other data from sensors on the wearable device 100 may be utilized to determine if the wearable device 100 is currently being worn. For example, data from an accelerometer, gyroscope, and proximity sensor may be combined alone, or with the other methods described above, to determine a probability of the worn state.

Upon determining the worn state of the wearable device 100, the worn-status module 206 may set a notification mode on the device. For example, the wearable device 100 may have two notification modes. The first mode may be the normal notification mode in which notifications are displayed on a display (e.g., the display 112). This mode may be set when the worn-status module 206 determines the wearable device 100 is being worn. The second mode may be a light notification mode using one or more light patterns when it is determined that the wearable device 100 is not being worn.

In various examples, the message module 210 manages notification messages received at the wearable device 100. The message module 210 may determine what notification mode the wearable device 100 is currently in and then determine how a message should be displayed (e.g., using the display or a light pattern) on the wearable device 100.

In various examples, the message module 210 functionality may be built into a framework running on the wearable device 100. For example, the light notifications discussed herein may be added into the Android™ notification framework in the following illustrative manner. While discussed with respect to the Android™ framework, the functionality may incorporated into other framework without departing from the scope of this disclosure.

Adding light notifications to the Android™ framework may include defining a Notification.AmbientStyle class (as a subclass android.app.Notification.Style). Notifications registered by applications would then be managed by android.app.NotificationManager. However, in various examples, unlike with other instances of android.app.Notification, the NotificationManager would be responsible for determining whether or not to trigger ambient notifications based on whether the device is worn and environmental light readings (e.g., those collected by the ambient light sensor 212).

The system running on the wearable device 100 would allow applications to register notification messages aimed for the ambient display (e.g., the light emitting element) by passing instances of Notification.AmbientStyle when creating a Notification object using Notification.Builder's setStyle( ) method. Notification types may include, but are not limited to, battery status, alarms, calendar events, social networking, incoming phone-calls, text messages, and email.

The Notification.AmbientStyle class, or a similar class if working within a different OS or framework, may be used to override the default notification behavior, for example, such that setProgress( ) is conveyed through lights (see FIG. 5) rather than a ProgressBar. A set of parameters and constants may be used to define presentation primitives used by the Notification object. These parameters may be used to set color (hue, saturation, and brightness), motion (pattern, direction, speed, and duration), and duration. For example, consider the following example setter methods and consts:

| | |
|---|---|
| Notification.AmbientStyle | setColor(int argb, int duration) |
| Notification.AmbientStyle | setColor(int start_argb, int end_argb, int duration) |
| Notification.AmbientStyle | setDuration(int duration) |
| Notification.AmbientStyle | setMotion(int motion_type, byte repeat_behavior) |
| int | MOTION_PULSE |
| int | MOTION_FADE_IN |
| int | MOTION_FADE_OUT |
| int | MOTION_FLASH |
| int | MOTION_SPINNING_POINT |
| int | MOTION_CAROUSEL |
| int | MOTION_BOUNCE |

In various examples, the ambient light sensor 212 is used to measure the intensity of light surrounding the wearable device 100. The light intensity may be used to alter the notification mode. For example, if the light intensity is above a certain threshold, it may be determined that the ambient lighting effect produced by the light emitting elements 110 could not be seen well. Accordingly, even if the worn state is determined to be "not worn," the notification mode may stay in the first, or "normal" notification mode.

The light intensity may also be used to alter the level of brightness used by the light emitting elements. For example, as the measured light intensity goes down, the level of brightness of the light emitting elements 110 may also decrease. Various setting correlations between measured light intensity and level of brightness may be stored on the wearable device 100. Periodically, the light intensity may be measured and the corresponding level of brightness may then be used for the light emitting elements 110.

In various examples, the input gesture module 214 may be used to detect user input with the wearable device 100. The input may include physical interactions (e.g., touch or gestures) with the display 112 as well as non-physical interactions (e.g., voice). For example, when the wearable device 100 is in the light notification mode, a user may wish to see more information about a notification. Consider a situation in which a light pattern is being used that represents an important e-mail message. A user may make a gesture such as waving his/her hand over the wearable device 100, which signifies that the content message is to be displayed on the display 112.

Gestures may be detected in a number of ways. For example, the wearable device 100 may have a speaker that outputs an inaudible frequency. When a user places or passes his or hand over the speaker, a microphone may detect a change in attenuations caused by the Doppler effect. This may trigger the wearable device 100 to display the content. Other triggers may also be used such as stopping the notification (e.g., signifying the user has received the message). Sensors on the wearable device 100 may also be used to detect a gesture or interaction. For example, an accelerometer may be used to detect when a user taps the wearable device 100. A sensor may detect voice commands from the user to stop the notification pattern, display additional information about the message, or playback the message.

In various examples, the network interface device 216 is used to connect to one or more networks. The network interface device 216 may include one or more transmitters, receivers, and transceivers that are compatible with a variety of network protocols and frequencies. A network may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network may include a single local area network (LAN) or wide-area network (WAN), or combinations of LAN's or WAN's, such as the Internet. The various devices coupled to the network(s) may be coupled to the network(s) via one or more wired or wireless connections. In various examples, the wearable device 100 is a stand-alone device that connects to a network, such as the Internet to receive some types of messages. In an example, the wearable device 100 is a secondary device that is paired with a primary device (e.g., a mobile phone, tablet, or personal computer) from which the wearable device 100 receives messages.

In various examples, the user preferences 218 store information associated with how the notifications are to be presented on the wearable device 100. For example, the user preferences may store the threshold light intensity for when the light notification mode is enabled. Other user preferences may include what action to take when a user gesture is detected (e.g., when a tap is detected vs. a wave). The user preferences 218 may also identify which light pattern notification to use with a type of a message. For example, progress messages may be set to use the "progress indication" light pattern whereas an e-mail message may set to the "carousel" pattern.

The user preferences 218 may be set in a variety of ways. For example, a user interface may be presented on the display 112 in which the user sets his or her preferences. A website may present the user interface and inputs received on the website may be passed to the wearable device 100 through the network interface device 216. In another example, the preferences may be set on a primary computing device and passed to the wearable device 100.

Figure 6:
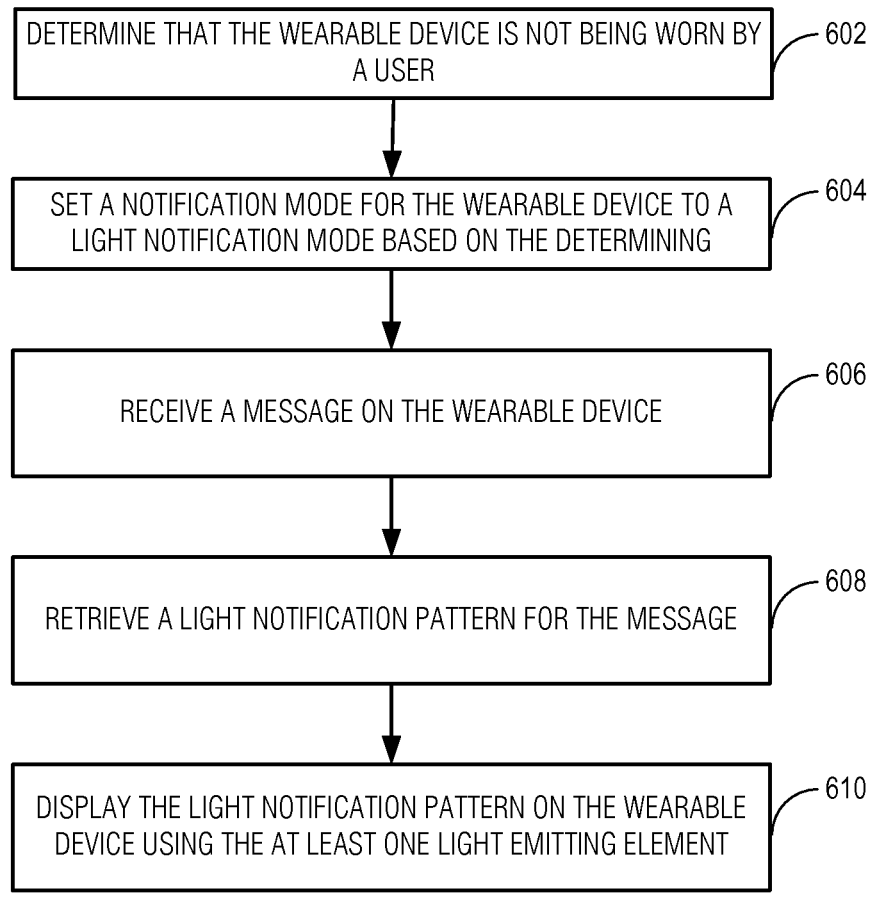
FIG. 6 is a flow chart illustrating a method, in accordance with an example embodiment, to display a light notification pattern.

FIG. 6 is a flow chart illustrating a method, in accordance with an example embodiment, to display a light notification pattern. The method may be performed by any of the modules, logic, or components described herein.

At block 602, it is determined that the wearable device is not being worn by user. In an example, the determination may be made using the state of a clasp of the wearable device. The state may be an open or closed state and the open state may indicate the user is not wearing the device.

At block 604, in an example, a notification mode for the wearable device is set to a light notification mode based on the determining. In an example, the light notification mode is used to control one or more light emitting element of the wearable device to present light notification patterns (e.g., patterns such as those illustrated in FIGS. 3-5) associated with a message. In an example, the light notification mode turns off the display of the wearable device.

In various embodiments, an ambient light sensor is included on the wearable device that measures the light intensity surrounding the wearable device. The level of light intensity may be compared to a threshold and used to determine if the notification mode should be set to the light notification mode based on the comparison.

At block 606, in an example, a message is received on the wearable device. A message may be one of many types, including, but not limited to battery status, alarms, calendar events, social networking, incoming phone-calls, text messages, and e-mail. The message may be received from via a network interface device of the wearable device. In various embodiments, the message includes a value such as the value of progress (e.g., 50%) when the message is a progress notification message.

At block 608, in an example, a light notification pattern is retrieved for the message. Various light patterns may be stored on the wearable device. User preferences may also be stored that correlate a message type with a light notification pattern. When the a message is received, the light notification pattern may be retrieved that is correlated with the type of message. For example, an e-mail message type may be correlated with a fade-in pattern whereas a call phone-call message may be correlated with a flashing pattern. The light notification patterns may include data identifying which light emitting elements to illuminate at which times and color of the light emitting elements.

At block 610, in an example, the light notification pattern is displayed on the wearable device using at least one light emitting element of the wearable device. Displaying may include setting a light emitting element to a certain color or brightness according to the light notification pattern over time (e.g., in a sequence). In an example, the brightness may be changed based on the measured light intensity using the ambient light sensor.'

In various examples, the wearable device may be interacted with while in the light notification mode. For example, a user input gesture may be detected such as a wave over the device or a tap. Based on the detection of a gesture, content included in the message may be displayed on the wearable device. For example, the display of the wearable device may be temporarily turned on and an e-mail message may be displayed. In an example, based on the detection of a gesture, the light notification pattern may be halted and one or more of the light emitting elements may be turned off.

Example Computer System

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
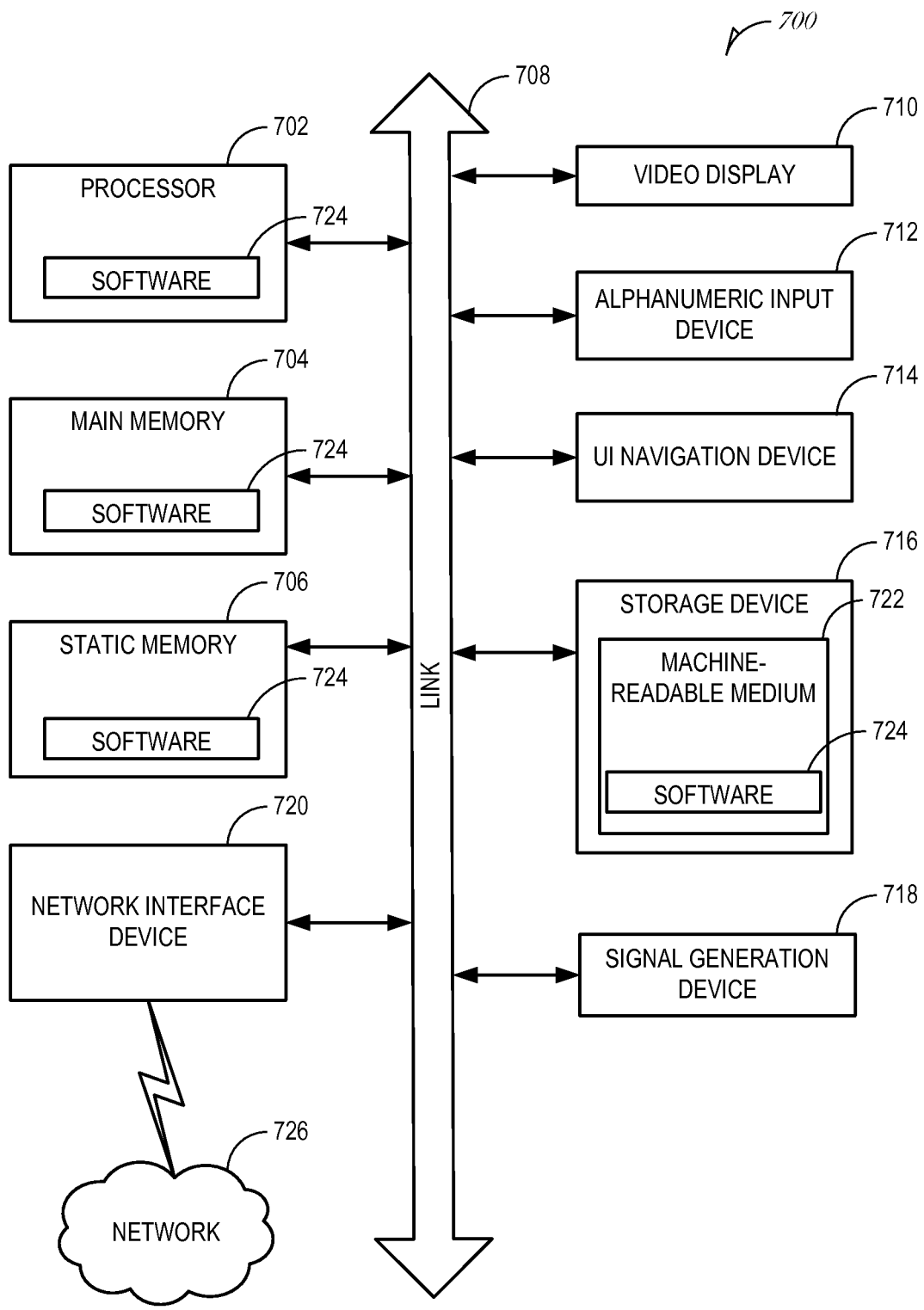
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 includes subject matter (such as a device, apparatus, or machine) comprising an wearable device comprising: an inward-facing surface; an outward-facing surface; a plurality of light emitting elements disposed on the inward-facing surface; a worn-status module to detect a worn-status of the wearable device and set the notification mode to a light notification mode when the worn-status indicates the wearable device is not being worn; a message module to receive a message; and a notification module to, based on the receipt of the message and the worn-status of the wearable device, control the plurality of light emitting elements.

In Example 2, the subject matter of Example 1 may include an ambient light sensor to measure an intensity of light, wherein the notification module controls the plurality of light emitted elements based on the intensity of light.

In Example 3, the subject matter of any one or more of Examples 1 to 2 may include, wherein to control the plurality of light emitting elements based on the intensity of the light, the notification module enables at least one of the light emitting elements when the intensity of light is below a threshold light intensity.

In Example 4, the subject matter of any one or more of Examples 1 to 3 may include, wherein the notification module adjusts a level of brightness of the plurality of light emitting elements based on the intensity of light.

In Example 5, the subject matter of any one or more of Examples 1 to 4 may include, a clasp, wherein the worn-status module determines the worn-status based on the state of the clasp.

In Example 6, the subject matter of any one or more of Examples 1 to 5 may include, wherein the notification module is to turn on at least one of the light emitting elements when the worn-status indicates the wearable device is not being worn.

In Example 7, the subject matter of any one or more of Examples 1 to 6 may include, wherein the notification module is to control the light emitting elements based on a type of the message.

In Example 8, the subject matter of any one or more of Examples 1 to 7 may include, wherein the type of the message is a progress notification message and the number of the light emitting elements turned on is based on a value of the progress included in the message.

In Example 9, the subject matter of any one or more of Examples 1 to 8 may include a gesture module to detect an input gesture and wherein the notification module is to control the plurality of light emitting elements based on the input gesture.

In Example 10, the subject matter of any one or more of Examples 1 to 9 may include, wherein the notification module is to turn off at least one of the plurality of light emitting elements based on detecting the input gesture.

Example 11 includes or may be combined with the subject matter of any one or more of Examples 1 to 10 to include subject matter for controlling at least one light emitting element on a wearable device (such as a method, means for performing acts, machine readable medium including instructions that when performed by a machine cause the machine to performs acts, or an apparatus configured to perform) comprising: determining, using at least one processor, that the wearable device is not being worn by a user; setting a notification mode for the wearable device to a light notification mode based on the determining; receiving a message on the wearable device; retrieving a light notification pattern for the message; and displaying the light notification pattern on the wearable device using the at least one light emitting element.

In Example 12, the subject matter of Example 11 may include, wherein retrieving a light notification pattern for the message includes: retrieving the light notification pattern based on a type of the message.

In Example 13, the subject matter of any one or more of Examples 11 to 12 may include, wherein displaying the light notification pattern on the wearable device includes setting a color of the at least one light emitting element according to the light notification pattern.

In Example 14, the subject matter of any one or more of Examples 11 to 13 may include, measuring, using an ambient light sensor of the wearable device, the light intensity surrounding the wearable device.

In Example 15, the subject matter of any one or more of Examples 11 to 14 may include, setting a brightness level of the at least one light emitting element based on the light intensity.

In Example 16, the subject matter of any one or more of Examples 11 to 15 may include, wherein setting the notification mode for the wearable device to a light notification mode is based on the light intensity being below a threshold light intensity.

In Example 17, the subject matter of any one or more of Examples 11 to 16 may include, wherein determining that the wearable device is not being worn by a user includes determining the state of a clasp of the wearable device.

In Example 18, the subject matter of any one or more of Examples 11 to 17 may include, wherein retrieving a light notification pattern for the message includes retrieving a pattern sequence identifying at least one lighting element to illuminate.

In Example 19, the subject matter of any one or more of Examples 11 to 18 may include, while in the light notification mode, detecting a user input gesture; and based on the detection of the user input gesture, displaying content associated with the message on a display of wearable device.

In Example 20, the subject matter of any one or more of Examples 11 to 19 may include, while in the light notification mode, detecting a user input gesture; and based on the detection of the user input gesture, halting the display of the light notification pattern.

Example 21 includes or may be combined with the subject matter of any one of Examples 1-20 to include an apparatus comprising means for performing any of the Examples 1-20.

Example 22 includes a wearable device comprising means for determining that the wearable device is not being worn by a user; means for setting a notification mode for the wearable device to a light notification mode based on the determining; means for receiving a message on the wearable device; means for retrieving a light notification pattern for the message; and means for displaying the light notification pattern on the wearable device using the at least one light emitting element.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A wearable device comprising:
   an inward-facing surface;
   an outward-facing surface;
   a plurality of light emitting elements disposed on the inward-facing surface;
   a worn-status module to detect a worn-status of the wearable device and set the notification mode to a light notification mode when the worn-status indicates the wearable device is not being worn;
   a message module to receive a message; and
   a notification module to, based on the receipt of the message and the worn-status of the wearable device, control the plurality of light emitting elements.

2. The wearable device of claim 1, further comprising an ambient light sensor to measure an intensity of light, wherein the notification module controls the plurality of light emitted elements based on the intensity of light.

3. The wearable device of claim 2, wherein to control the plurality of light emitting elements based on the intensity of the light, the notification module enables at least one of the light emitting elements when the intensity of light is below a threshold light intensity.

4. The wearable device of claim 2, wherein the notification module adjusts a level of brightness of the plurality of light emitting elements based on the intensity of light.

5. The wearable device of claim 1, further comprising a clasp, wherein the worn-status module determines the worn-status based on the state of the clasp.

6. The wearable device of claim 1, wherein the notification module is to turn on at least one of the light emitting elements when the worn-status indicates the wearable device is not being worn.

7. The wearable device of claim 1, wherein the notification module is to control the light emitting elements based on a type of the message.

8. The wearable device of claim 7, wherein the type of the message is a progress notification message and the number of the light emitting elements turned on is based on a value of the progress included in the message.

9. The wearable device of claim 1, further comprising a gesture module to detect an input gesture and wherein the notification module is to control the plurality of light emitting elements based on the input gesture.

10. The wearable device of claim 9, wherein the notification module is to turn off at least one of the plurality of light emitting elements based on detecting the input gesture.

11. A machine-readable medium including instructions for controlling at least one light emitting element on a wearable device, which when executed by the wearable device, cause the wearable device to perform operations comprising:
   determining, using at least one processor, that the wearable device is not being worn by a user;
   setting a notification mode for the wearable device to a light notification mode based on the determining;
   receiving a message on the wearable device;
   retrieving a light notification pattern for the message; and
   displaying the light notification pattern on the wearable device using the at least one light emitting element.

12. The machine-readable medium of claim 11, wherein retrieving a light notification pattern for the message includes:
   retrieving the light notification pattern based on a type of the message.

13. The machine-readable medium of claim 11, wherein displaying the light notification pattern on the wearable device includes setting a color of the at least one light emitting element according to the light notification pattern.

14. The machine-readable medium of claim 11, the operations further comprising:
   measuring, using an ambient light sensor of the wearable device, the light intensity surrounding the wearable device.

15. The machine-readable medium of claim 14, the operations further comprising:
setting a brightness level of the at least one light emitting element based on the light intensity.

16. The machine-readable medium of claim 14, wherein setting the notification mode for the wearable device to a light notification mode is based on the light intensity being below a threshold light intensity.

17. The machine-readable medium of claim 11, wherein determining that the wearable device is not being worn by a user includes determining the state of a clasp of the wearable device.

18. The machine-readable medium of claim 11, wherein retrieving a light notification pattern for the message includes retrieving a pattern sequence identifying at least one lighting element to illuminate.

19. The machine-readable medium of claim 11, the operations further comprising:
while in the light notification mode, detecting a user input gesture; and
based on the detection of the user input gesture, displaying content associated with the message on a display of wearable device.

20. The machine-readable medium of claim 11, the operations further comprising:
while in the light notification mode, detecting a user input gesture; and
based on the detection of the user input gesture, halting the display of the light notification pattern.

21. A method to control at least one light emitting element on a wearable device, the method comprising:
determining that the wearable device is not being worn by a user;
setting a notification mode for the wearable device to a light notification mode based on the determining;
receiving a message on the wearable device;
retrieving a light notification pattern for the message; and
displaying the light notification pattern on the wearable device using the at least one light emitting element.

22. The method of claim 21, wherein retrieving a light notification pattern for the message includes:
retrieving the light notification pattern based on a type of the message.

23. The method of claim 21, wherein displaying the light notification pattern on the wearable device includes setting a color of the at least one light emitting element according to the light notification pattern.

24. The method of claim 21, further comprising:
measuring, using an ambient light sensor of the wearable device, the light intensity surrounding the wearable device.

25. The method of claim 24, further comprising:
setting a brightness level of the at least one light emitting element based on the light intensity.

\* \* \* \* \*